US012778840B2

(12) United States Patent
Liu et al.

(10) Patent No.: US 12,778,840 B2
(45) Date of Patent: Nov. 3, 2026

(54) MALE SEXUAL STIMULATION TOY

(71) Applicant: HYTTO PTE. LTD., Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 956 days.

(21) Appl. No.: 18/152,696

(22) Filed: Jan. 10, 2023

(65) Prior Publication Data

US 2024/0225950 A1 Jul. 11, 2024

(51) Int. Cl.
*A61H 19/00* (2006.01)

(52) U.S. Cl.
CPC ..... *A61H 19/32* (2013.01); *A61H 2201/1671* (2013.01)

(58) Field of Classification Search
CPC .......... A61F 19/00; A61F 19/30; A61F 19/32; A61F 19/50; A61F 5/41; A61F 2005/414
See application file for complete search history.

(56) References Cited

FOREIGN PATENT DOCUMENTS

| | | | | |
|---|---|---|---|---|
| EP | 3260106 A1 | | 12/2017 | |
| ES | 2498291 T3 | | 9/2014 | |
| WO | WO2009062452 | * | 5/2009 | .............. A61F 5/41 |

OTHER PUBLICATIONS

Danyon Anderson, John Laforge, Maggie M. Ross, Robert Vanlangendonck, Jamal Hasoon, Omar Viswanath, Alan D. Kaye, and Ivan Urits, Male Sexual Dysfunction, Health Psychol Res. 2022; 10(3):37533, Aug. 20, 2022, United States of America.

* cited by examiner

*Primary Examiner* — Carrie R Dorna
(74) *Attorney, Agent, or Firm* — Holtz, Holtz & Volek PC

(57) ABSTRACT

Embodiments of the present disclosure disclose a male sexual stimulation toy. The male sexual stimulation toy includes a housing having a hollow structure with a first end and a second end opposite to the first end of the housing. An opening formed at the first end or the second end of the housing is configured to receive a penis inserted into an interior of the housing. A massage wheel assembly is disposed in the housing along at least one side of a direction of insertion of the penis. The massage wheel assembly includes at least one wheel body and at least one rotating shaft extending along a central axis of the wheel body, and the wheel body is configured to rotate along with the rotating shaft inside the housing to provide sexual stimulation to the penis inserted.

10 Claims, 13 Drawing Sheets

MALE SEXUAL STIMULATION TOY

TECHNICAL FIELD

The present disclosure relates to sexual pleasure devices and, more particularly relates, to the massagers or toys for engaging and sexually stimulating the human body, particularly the penis.

BACKGROUND

Sexual stimulating massage is used to develop and enhance sexual arousal in the human body. A sexual stimulator creates sexual stimulation by engaging the stimulator in sensitive erogenous zones of the human body for sexual pleasure. For instance, the sexual stimulator can be used for creating sexual pleasure in various body parts such as the penis, vulva, clitoris, vagina, and the like.

A variety of sexual stimulation massagers such as sex toys, adult toys, suction cups, dildos, etc., are available in the market for performing a variety of functions, ranging from medical therapy to erotic stimulation. The stimulating massagers are designed to provide massaging effects through several operations like vibration, expansion and contraction, suction, etc. However, the movement of these sexual stimulation massagers is fairly limited. Also, the currently available stimulating massagers are not designed specifically to accommodate the physiologies of different kinds of users while stimulating more than one area of the body simultaneously and providing independent user control of the stimulation. Also, it is noted that the conventional stimulating massagers or toys have a short service life, need to be replaced after a relatively short time due to the design of the movement mechanisms, and do not provide maximum sexual pleasure.

Therefore, there exists a need for a male sexual stimulation toy with an improved mechanism of movement to enhance sexual arousal on the user's body.

SUMMARY

Various embodiments of the present disclosure provide a male sexual stimulation toy for providing sexual stimulation and enhancing sexual arousal on the user's body by covering large surface area of the penis.

In an embodiment, a male sexual stimulation toy is disclosed. The male sexual stimulation toy includes a housing having a hollow structure with a first end and a second end opposite to the first end of the housing. An opening formed at the first end or the second end of the housing is configured to receive a penis inserted into an interior of the housing. A massage wheel assembly is disposed in the housing along at least one side of a direction of insertion of the penis. The massage wheel assembly includes at least one wheel body and at least one rotating shaft extending along a central axis of the wheel body, and the wheel body is configured to rotate along with the rotating shaft inside the housing to provide sexual stimulation to the penis inserted.

In another embodiment, a male sexual stimulation toy for providing maximum pleasure to the penis is disclosed. The male sexual stimulation toy includes a housing having a hollow structure with a first end and a second end opposite to the first end of the housing. An opening formed at the first end or the second end of the housing is configured to receive a penis inserted into an interior of the housing. An articulating massage wheel assembly is disposed in the housing along at least one side of a direction of insertion of the penis.

The articulating massage wheel assembly includes at least one articulating wheel body and at least one connecting shaft extending along a central axis of the articulating wheel body. A plurality of guide rails is mounted outside the housing and adapted to couple to the articulating massage wheel assembly through the connecting shaft. A plurality of sliders is adapted to couple the connecting shaft to the plurality of guide rails. The articulating massage wheel assembly is configured to slide along the plurality of guide rails by means of the plurality of sliders. A plurality of stop structures is adapted to constrict on the plurality of guide rails to limit reciprocatory motion of the articulating massage wheel assembly. The articulating wheel body of the articulating massage wheel assembly is configured to squeeze the penis inserted due to constriction of the stop structure thereby providing sexual stimulation to the penis.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
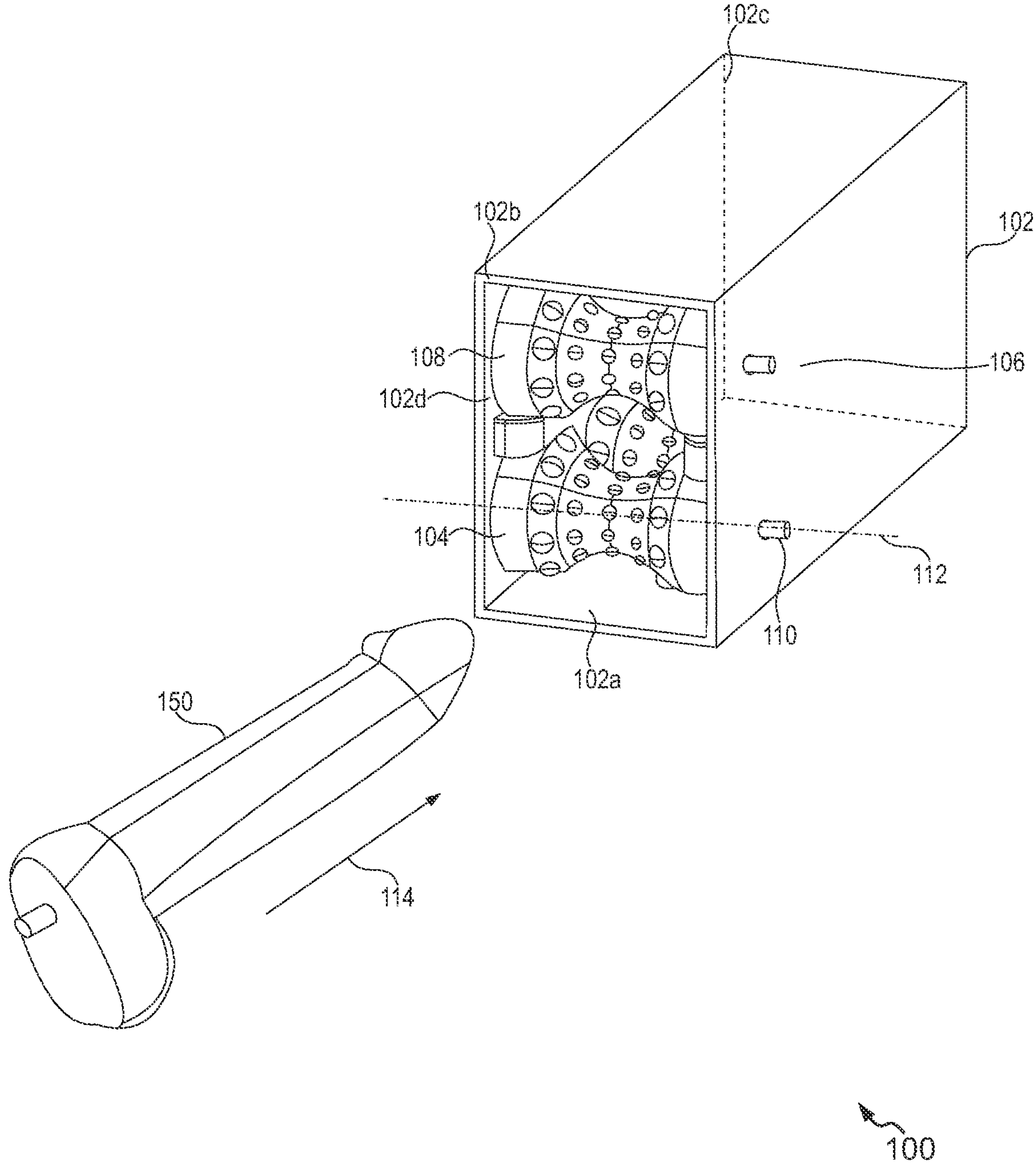
FIG. 1 illustrates a perspective view of a male sexual stimulation toy, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various examples of the present disclosure provide male sexual stimulating toy. In an embodiment, a male sexual stimulation toy is disclosed. The male sexual stimulation toy includes a housing having a hollow structure with a first end and a second end opposite to the first end of the housing. An opening formed at the first end or the second end of the housing is configured to receive a penis inserted into an interior of the housing. A massage wheel assembly is disposed in the housing along at least one side of a direction of insertion of the penis. The massage wheel assembly includes at least one wheel body and at least one rotating shaft extending along a central axis of the wheel body, and the wheel body is configured to rotate along with the rotating shaft inside the housing to provide sexual stimulation to the penis inserted. In one form, the male sexual stimulation toy is mechanically operated through the thrust force from a user and follows the process of extrusion. In another form, the male sexual stimulation toy is electrically operated by a DC (Direct Current) motor or AC (Alternating Current) motor powered by a battery or a power source. The rotation of the wheel bodies arranged in the housing in synchronization with each other provides sexual stimulation to the dorsal and ventral portion of the penis. The rate of insertion and removal of the penis into and out of the male sexual stimulation toy depends on the thrust force applied by the user. Alternatively, the rate of insertion and removal of the penis into and out of the male sexual stimulation toy is altered by controlling the rotations per minute (rpm) of the shaft of the DC motor or AC motor.

In one embodiment, the wheel bodies of the male sexual stimulation toy are having both rotational motion and reciprocatory motion simultaneously to provide maximum sexual pleasure.

Various example embodiments of the present disclosure are described hereinafter with reference to FIG. 1 to FIGS. 9A-9D.

FIG. 1 illustrates a perspective view of a male sexual stimulation toy 100, in accordance with an embodiment of the present disclosure. The male sexual stimulation toy 100 is designed for providing sexual stimulation and enhancing sexual arousal on the user's body. Specifically, the male sexual stimulation toy 100 is designed to accommodate the physiologies of different kinds of users while simultaneously stimulating larger surface area of a penis 150 of the users' body and providing independent user control of the stimulation.

The male sexual stimulation toy 100 includes a housing 102 and a massage wheel assembly 104. The housing 102 is a unitary structure or split at least into two parts (See FIG. 2). The housing 102 has a hollow structure 102*a* with a first end 102*b* and a second end 102*c* opposite to the first end 102*b* of the housing 102. The housing 102 has an opening 102*d* at the first end 102*b* or second end 102*c* wherein the opening 102*d* is configured to receive the penis 150 inserted into an interior 106 of the housing 102. It should be noted that the shape of the housing 102 is not limited to that shown in FIG. 1, and can take any other forms and shapes. The massage wheel assembly 104 includes at least one wheel body 108 and at least one rotating shaft 110 extending along a central axis 112 of the wheel body 108. The massage wheel assembly 104 is disposed in the housing 102 along at least one side of a direction 114 of insertion of the penis 150. The massage wheel assembly 104 includes one or more pairs of wheel bodies 108 arranged in multiple configurations inside the housing 102 including but not limited to rows, columns, or inclined at different angles which rotate along the respective one or more pairs of rotating shafts 110 inserted into the housing 102 to provide sexual stimulation to the penis 150 inserted therein. In one form, the rotating shaft 110 is mounted on a bearing disposed at least at each end of the rotating shaft 110. The bearings used for supporting the rotating shaft 110 may be one of roller bearings, ball bearings, journal bearings, or magnetic bearings. Also, the bearing is designed to eliminate friction and vibration generated during the operation of the rotating shaft 110. The material used for the housing 102 is soft and lightweight material that does not cause injury or infection to the user's body. For example, the materials such as silicon, borosilicate glass, lucite, stainless steel, etc., can be used to fabricate the housing 102. In one configuration, the housing 102 may be made of transparent material to facilitate the user during the operation of the male sexual stimulation toy 100.

The housing 102 of the male sexual stimulation toy 100 may be covered with a gripping material over its surface. The housing 102 may be formed with grooves, textures, cross patterns, or a combination thereof to provide a frictional effect to the user's palm during holding. The gripping surface assists in transmitting the force applied by the user and eliminating the chances of slippage from the user's palm.

The wheel bodies 108 rotate freely along the respective rotating shafts 110 inside the housing 102 due to the thrust given to the penis 150 by the user and the opposite force given by the user's palm while holding the male sexual stimulation toy 100 during its operation. The operation of the wheel bodies 108 along the respective rotating shafts 110 inside the housing 102 is explained further in detail with respect to FIG. 2.

The male sexual stimulation toy 100 comes in different sizes. The axial length of the male sexual stimulation toy 100 depends on the stroke length of the penis 150 of the user.

In a non-limiting configuration, the wheel bodies 108 of the male sexual stimulation toy 100 are provided with thermal stimulation, vibration stimulation, and sucking stimulation. Also, the wheel bodies 108 may be provided with pores on their surface to dispense natural or synthetic lubricant to avoid friction while insertion of the penis 150 into the male sexual stimulation toy 100. The pores provided on the wheel bodies 108 of the male sexual stimulation toy 100 may be designed to dispense a medicated liquid or oil for increasing the sexual pleasure of the penis 150.

In another embodiment, the male sexual stimulation toy 100 may be rotated in 360 degrees along the axis of the penis 150 during the process of insertion by covering all the surface area of the penis 150 to provide maximum stimulation. The rotation of the male sexual stimulation toy 100 in 360 degrees can be done manually by the user or electrically by a power source. The rotation of the male sexual stimulation toy 100 is achieved electrically only by providing a holder attached to the housing 102 wherein the housing 102 rotates with respect to the holder held in the user's palm.

Figure 2:
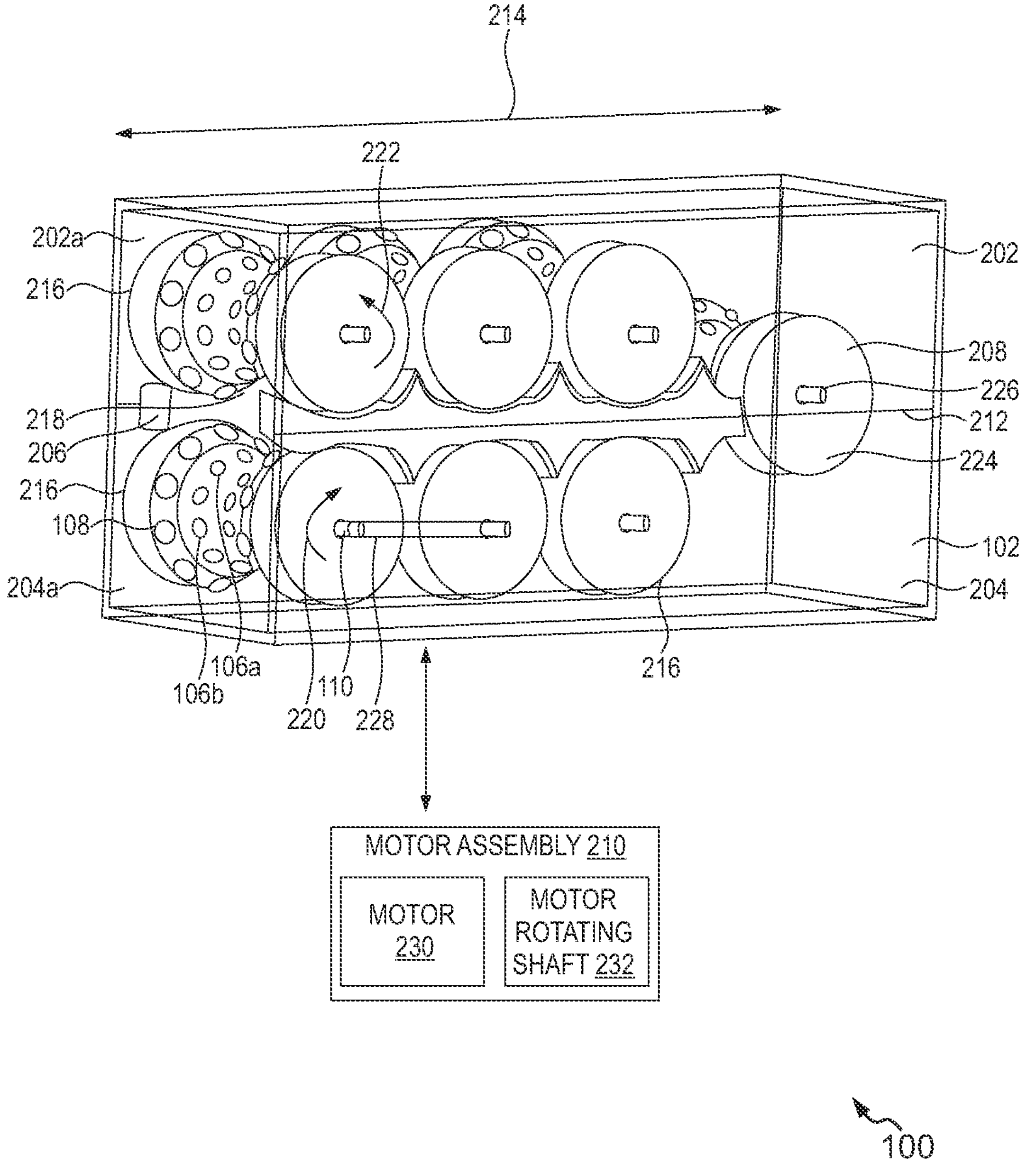
FIG. 2 illustrates a schematic representation of internal components of the male sexual stimulation toy inside a housing of FIG. 1, in accordance with an embodiment of the present disclosure.

FIG. 2 illustrates a schematic representation of an internal configuration of the male sexual stimulation toy 100 inside a housing 102 of FIG. 1, in accordance with an embodiment of the present disclosure. The male sexual stimulation toy 100 includes an upper housing 202, a lower housing 204, a separation structure 206, a stopper massage wheel assembly 208, and a motor assembly 210. The upper housing 202 and the lower housing 204 having a first hollow structure **202*a* and a second hollow structure 204*a* respectively are joined together along a horizontal parting plane 212 to form the opening 102*d* at the first end 102*b* or the second end 102*c*. In one embodiment, the wheel bodies 108 of the massage wheel assembly 104 are disposed of in the first hollow structure 202*a* or second hollow structure 204*a* of at least one of the upper housing 202 or the lower housing 204 respectively along a longitudinal direction 214. In another embodiment, the wheel bodies 108 of the massage wheel assembly 104 are configured in both the upper housing 202 and the lower housing 204 along the longitudinal direction 214 in a plurality of rows and columns 216 defining a channel 218 in between therein for insertion of the penis 150. The arrangement of the wheel bodies 108 in the plurality of rows and columns 216 inside the upper housing 202 and the lower housing 204 facilitates in providing maximum stimulation to the penis 150 covering large surface area. The thrust given by the user to the penis 150 rotates the wheel bodies 108 in the lower housing 204 in clockwise direction 220 and the wheel bodies 108 in the upper housing 202 in the anti-clockwise direction 222. The wheel bodies 108 are provided with a cylindrical shaped surface or a concave shaped surface 106*a*. The wheel bodies 108 are further provided with a series of bulb shaped projections 106*b* all over the concave shaped surface 106*a* to increase the stimulating effect to the penis 150. The wheel bodies 108** are covered with silicone rubber or medical grade material.

The stopper massage wheel assembly 208 is disposed at either first end **102*b* or second end 102*c* of the housing 102 to act as a stopper mechanism. The stopper massage wheel assembly 208 includes a stopper wheel body 224 and a stopper rotating shaft 226. The tip of the penis 150 touches the stopper wheel body 224 and follows the movement of removal from the housing 102 by the application of force from the user. The stopper massage wheel assembly 208 apart from stimulating effect to the tip of the penis 150 also acts as a safety mechanism to prevent injury or impact on the base of the penis 150** or testis.

The separation structure 206 is mounted on either side of the horizontal parting plane 212 of the housing 102 separating the wheel bodies 108 in the upper housing 202 and the lower housing 204 and thereby acting as a safety mechanism. The wheel bodies 108 are adapted to freely rotate along the respective rotating shafts 110 and do not touch with each other in case of failure by falling off the wheel bodies 108 located in the upper housing 202 on the separation structure 206.

In one embodiment, the wheel bodies 108 of the massage wheel assembly 104 may rotate along the respective rotating shafts 110 independently by thrust force from the penis 150 or coupled to each other by a belt, chain or gear mechanism 228. In one embodiment, the stopper massage wheel assembly 208 may operate independently driven by a motor set in the stopper massage wheel assembly 208. In another embodiment, the stopper massage wheel assembly 208 may operate by coupling to the massage wheel assembly 104.

In another embodiment, the motor assembly 210 includes a motor 230 and a motor rotating shaft 232 operatively connected with the rotating shaft 110 of the massage wheel assembly 104 for driving the wheel body 108 to produce rotary motion. Alternatively, the motor 230 is disposed within the wheel body 108 such that the motor rotating shaft 232 of the motor 230 extends out of the wheel body 108. This arrangement of the motor 230 within the wheel body 108 is compact in design and serves the purpose of converting electrical energy into mechanical motion. The motor rotating shaft 232 of the motor 230 is connected to the rotating shaft 110 of the wheel body 108 by a rigid or flexible coupling. The wheel body 108 acts as a damper to absorb the vibration of the motor 230 that occurs during the running conditions. The motor 230 embodied in the wheel body 108 reduces the noise of the motor 230 generated during its operation. The motor rotating shaft 232 of the motor 230 rotates at one of the preset rotational speeds. The motor rotating shaft 232 of the motor 230 may be cylindrical in shape that is designed based at least on a torsional shear force, a bending moment, and a fatigue loading.

Figure 3A:
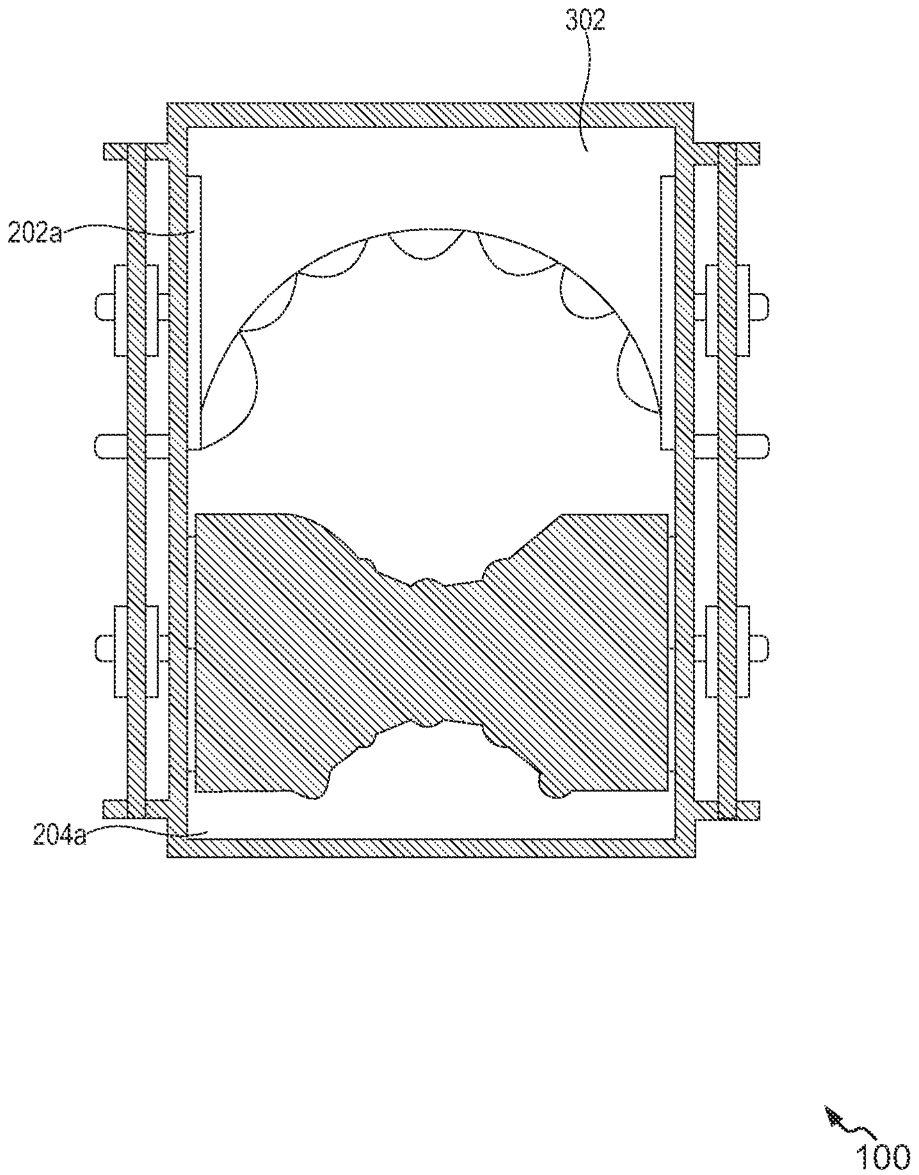
FIG. 3A illustrates a side cross-sectional view of arrangement of a surrounding component inside the housing of the male sexual stimulation toy of FIG. 2, in accordance with an embodiment of the present disclosure.

FIG. 3A illustrates a side cross-sectional view of an arrangement of a surrounding component inside the housing of the male sexual stimulation toy of FIG. 2, in accordance with an embodiment of the present disclosure. The male sexual stimulation toy 100 includes a surrounding component 302 configured in the first hollow structure **202*a* of the upper housing 202 or the second hollow structure 204*a* of the lower housing 204 along the longitudinal direction 214 and the wheel body 108 arranged in the second hollow structure 204*a* of the lower housing 204 or first hollow structure 202*a* of the upper housing 202 respectively. The surrounding component 302 is a flexible core that will provide both cushioning and stimulation effects. The surrounding component 302** is made up of foam-type material like polypropylene, polyethylene, polyurethane, expanded polystyrene etc.

Figure 3B:
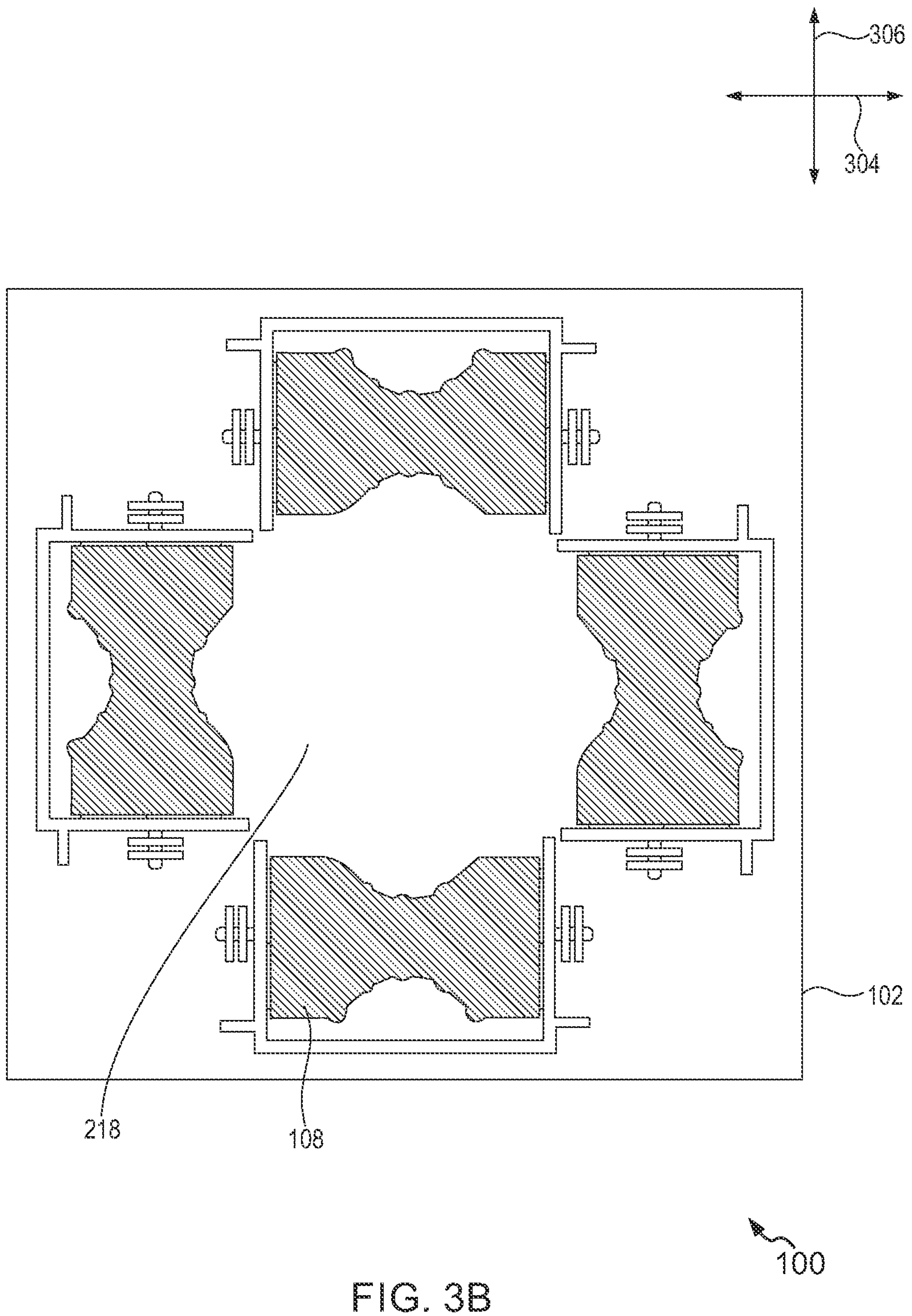
FIGS. 3B and 3C illustrate a schematic representation of arrangement of a wheel assembly of the male sexual stimulation toy inside the housing of FIG. 2, in accordance with an embodiment of the present disclosure.
Figure 3C:
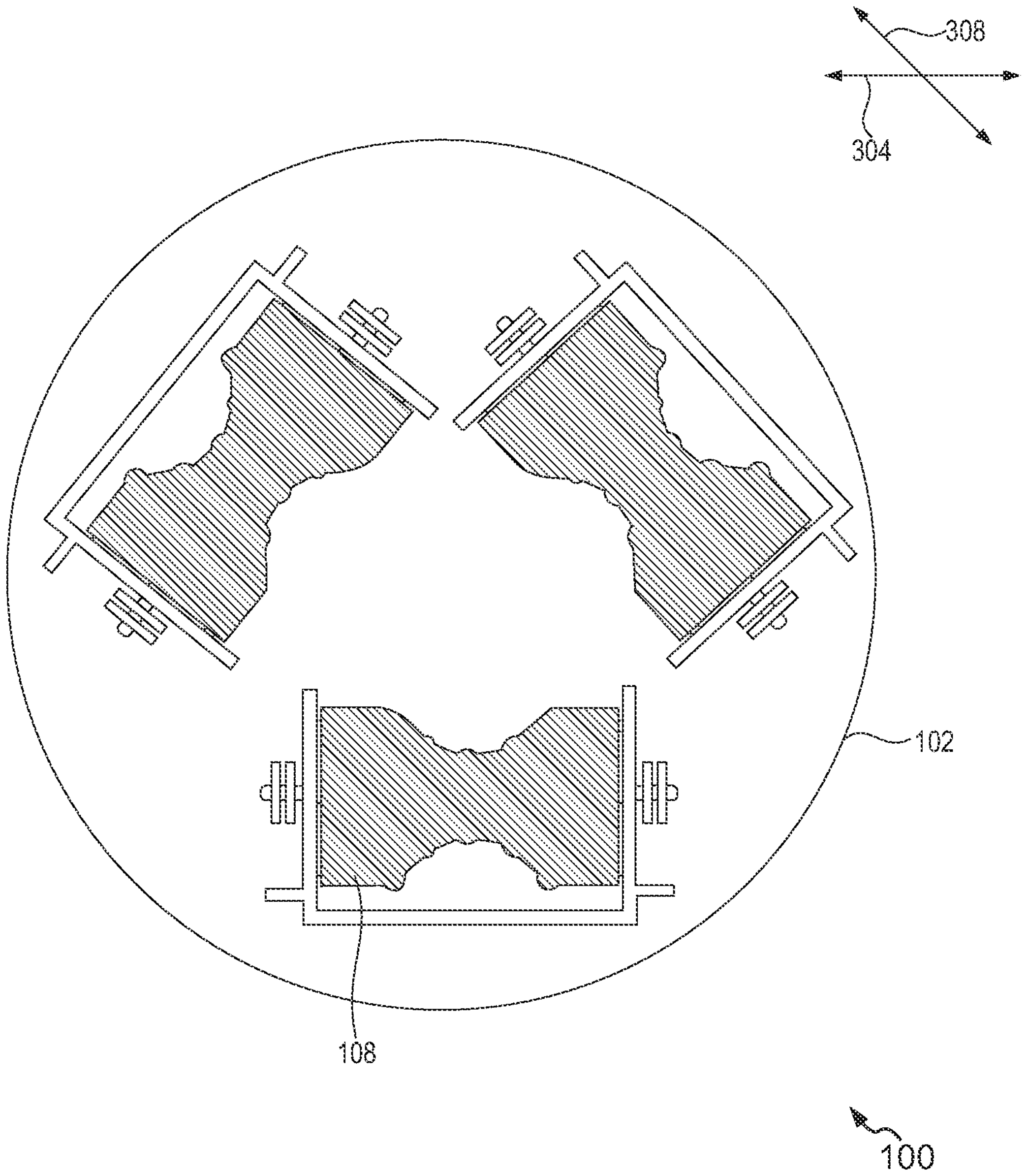

FIGS. 3B and 3C illustrate a schematic representation of arrangement of a wheel assembly of the male sexual stimulation toy inside the housing of FIG. 2, in accordance with an embodiment of the present disclosure. The male sexual stimulation toy 100 includes the housing 102 having a cross-section including but not limited to rectangle, square, circle, or polygon. One or more pairs of the wheel bodies 108 of the massage wheel assembly 104 operating relative to each other are configured inside the housing 102 in at least one of longitudinal, lateral, or inclining arrangement (304, 306 or 308) in the plurality of rows and columns 216 to form the channel 218 in between therein for the insertion of the penis 150. As discussed above, the wheel bodies 108 in the longitudinal arrangement 304 provide sexual stimulation to the dorsal and ventral portion of the penis 150 only but the wheel bodies 108 in the lateral arrangement 306 provide sexual stimulation to side portions of the penis 150. The wheel bodies 108 in inclining arrangement 308 provide sexual stimulation to the penis 150 in 360 degrees angle covering a large surface area of the penis 150.

Figure 4:
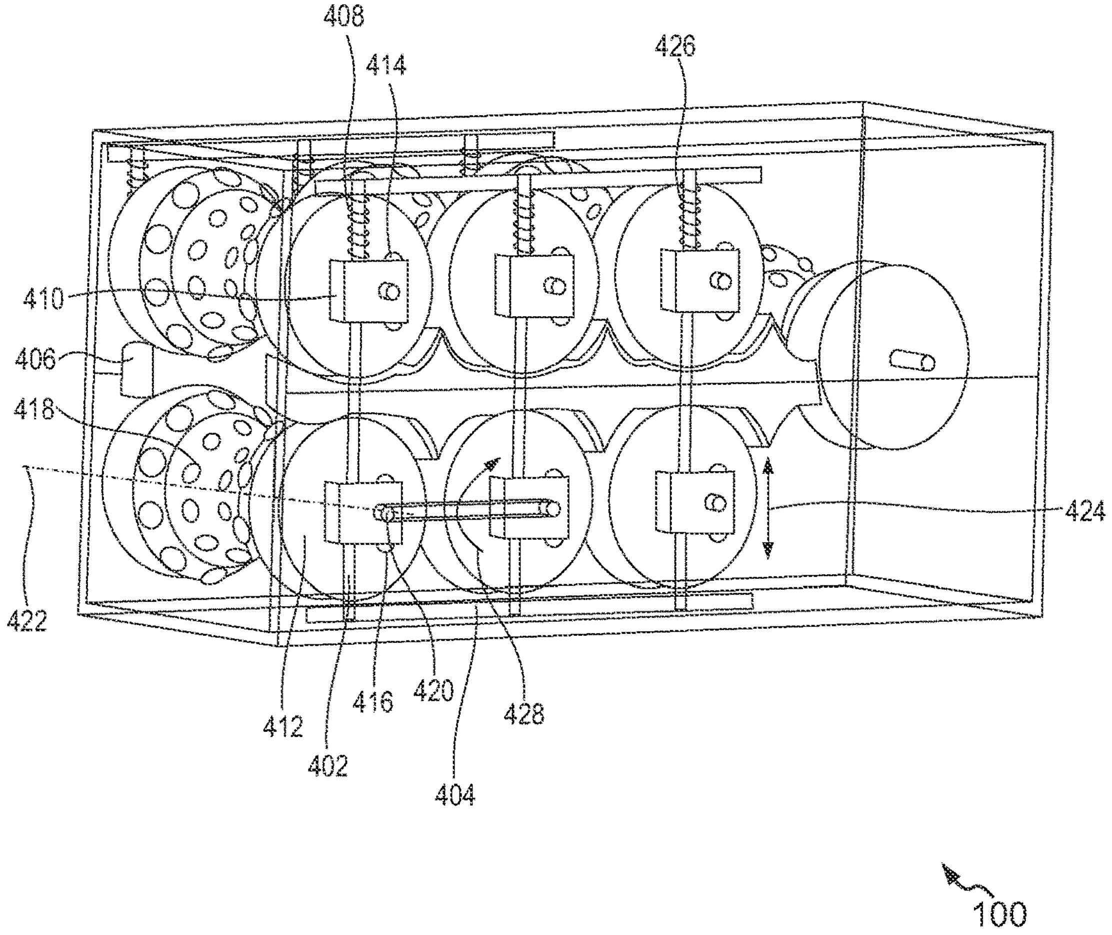
FIG. 4 illustrates a schematic representation of internal components of the male sexual stimulation toy, in accordance with another embodiment of the present disclosure.

FIG. 4 illustrates a schematic representation of the internal components of the male sexual stimulation toy, in accordance with another embodiment of the present disclosure. The male sexual stimulation toy 100 includes a plurality of guide rails 402, a plurality of mounting plates 404, a resting structure 406, a plurality of stop structures 408, a plurality of sliders 410, and an articulating massage wheel assembly 412. A plurality of slots 414 and 416 is provided in the upper housing 202 and the lower housing 204 respectively. In one scenario, the plurality of slots 414 and 416 provided in the upper housing 202 and the lower housing 204 is rounded at their ends. In one form, the plurality of guide rails 402 is mounted in between the plurality of mounting plates 404 attached to the upper housing 202 and the lower housing 204. The plurality of mounting plates 404 is attached to the upper housing 202 and the lower housing 204 by means of welding, brazing, soldering, adhesive or glue and the like. In another form, the plurality of guide rails 402 is mounted through direct coupling to the upper housing 202 and the lower housing 204.

The articulating massage wheel assembly 412 includes at least one articulating wheel body 418 and at least one connecting shaft 420 extending along a central axis 422 of the articulating wheel body 418. One or more pairs of articulating wheel bodies 418 of the articulating massage wheel assembly 412 operating relative to each other are respectively arranged in the first hollow structure **202*a* of the upper housing 202 and the second hollow structure 204*a* of the lower housing 204 separated by the resting structure 406 mounted on either side of the horizontal parting plane 212 of the housing 102 to form the channel 218 in between therein for insertion of the penis 150. In one configuration, the articulating wheel bodies 418 are adapted to mate against the resting structure 406. In another configuration, the articulating wheel bodies 418 and the resting structure 406 are provided with a clearance. One or more pairs of the articulating wheel bodies 418 are configured in the upper housing 202 and the lower housing 204 in such a way that one or more pairs of connecting shafts 420 extend out of the plurality of slots 414 and 416 of the upper housing 202 and the lower housing 204 and adapted to mate with the plurality of sliders 410 which in turn are adapted to slide over the plurality of guide rails 402. The connecting shafts 420 of the articulating wheel bodies 418 are coupled to each other by the belt, chain, or gear mechanism 228 to rotate the articulating wheel bodies 418 synchronously. The plurality of stop structures 408 limits a reciprocatory motion 424 of the articulating massage wheel assembly 412 within the plurality of sliders 410 and the plurality of mounting plates 404 of the upper housing 202 or the lower housing 204. The plurality of stop structures 408 includes a plurality of compression coil springs 426. The penis 150 is placed in between the channel 218 of the articulating wheel bodies 418 and thrust force is applied by the penis 150 which produces a rotary motion 428 of the articulating wheel bodies 418 squeezing the penis 150 into the interior 106 of the housing 102 due to restriction provided by the plurality of stop structures 408. The plurality of compression coil springs 426 is selected based on the predetermined pushing force to be exerted on the penis 150 to produce the stimulating effect. In one form, all the plurality of compression coil springs 426 used in the plurality of stop structures 408 may be uniform. In another form, each of the plurality of compression coil springs 426 used in the plurality of stop structures 408 may be varying. The pushing force to be exerted on the penis 150 is altered by varying the parameters of the plurality of compression coil springs 426** like a number of turns, diameter, pitch, wire diameter, etc.

In one configuration, both the articulating wheel bodies 418 in the upper housing 202 and the lower housing 204 are provided with the plurality of stop structures 408 to provide effective engagement of the penis 150 with the articulating wheel bodies 418 for a maximum stimulating effect. Also, the provision of the plurality of stop structures 408 to both the articulating wheel bodies 418 facilitates in the reciprocatory motion 424 of the articulating wheel bodies smoothly. In another configuration, at least the articulating wheel bodies 418 located in the lower housing 204 are provided with the plurality of stop structures 408 to enable them to retract to the resting structure 406 while the removal of the penis 150 from the male sexual stimulation toy 100.

In one embodiment, the articulating wheel bodies 418 of the upper housing 202 or the lower housing 204 are adapted to fix at a particular position of the plurality of guide rails 402 by means of a plurality of limiting structures 508 (See FIG. 5A, FIG. 5B and FIG. 5C) arresting the movement of the plurality of sliders 410 on the plurality of guide rails 402 thereby forming the channel 218 of a width 504 (See FIG. 5A and FIG. 5B) of predetermined value along the longitudinal direction 214. In another embodiment, the reciprocatory motion 424 of the articulating wheel bodies 418 is altered manually in the direction 114 of insertion of the penis 150 by altering positions of the plurality of sliders 410 along the plurality of guide rails 402 with the help of the hand of the user wherein the articulating wheel bodies 418 simultaneously rotate to provide sexual stimulation to the penis inserted. In yet another embodiment, the articulating wheel bodies 418 are adapted to rotate with the help of the motor 230 to provide sexual stimulation to the penis inserted.

In one embodiment, the connecting shafts 420 of the articulating wheel bodies 418 are configured in rotatable condition within the plurality of sliders 410 thus providing both the rotary motion 428 and the reciprocatory motion 424 simultaneously to the articulating wheel bodies 418. In another embodiment, the connecting shafts 420 of the articulating wheel bodies 418 are in fixed condition to the plurality of sliders 410 thus providing only the reciprocatory motion 424 to the articulating wheel bodies 418.

In one configuration, the plurality of guide rails 402 is cylindrical shaped. In another configuration, the plurality of guide rails 402 is rectangular or square shaped with a slot (track) provided in between therein. In one form, the plurality of sliders 410 may be rectangular or square blocks provided with a through hole provided therein to adapt to the plurality of guide rails 402. In another form, the plurality of sliders 410 may be provided with a plurality of rollers at their one end to adapt to the slot (track) of the plurality of guide rails 402. In one scenario, the plurality of guide rails 402 is mounted parallel to the plurality of sliders 410. In another scenario, the plurality of guide rails 402 is mounted perpendicular to the plurality of sliders 410.

Figure 5A:
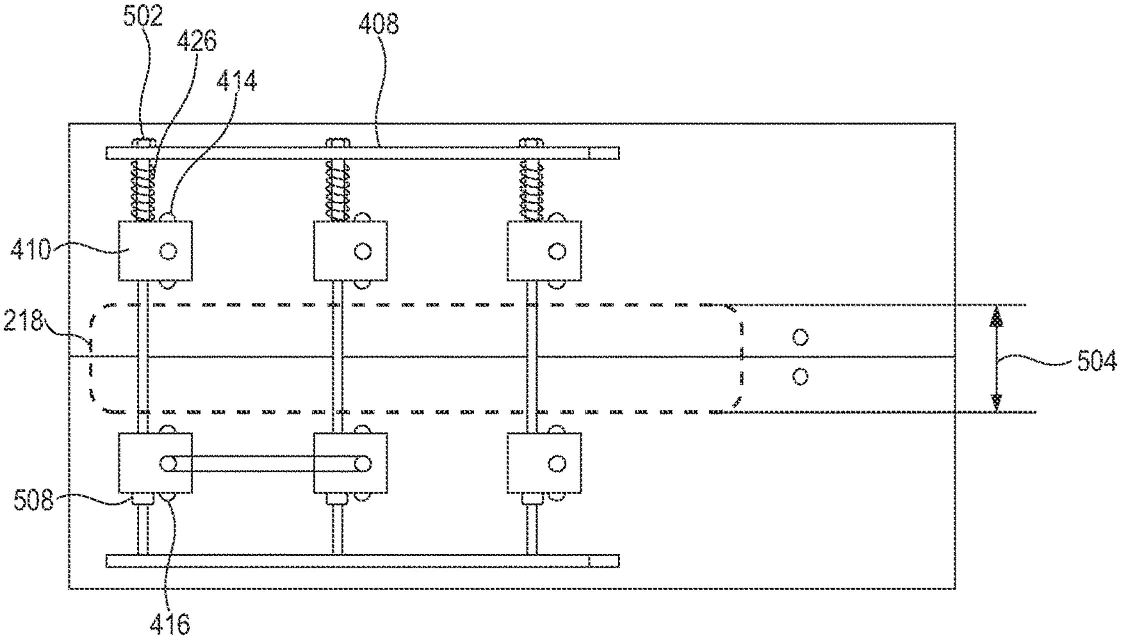
FIGS. 5A, 5B, and 5C illustrate a schematic representation of various configurations of a channel formed in between articulating wheel bodies of the male sexual stimulation toy of FIG. 4, in accordance with another embodiment of the present disclosure.
Figure 5B:
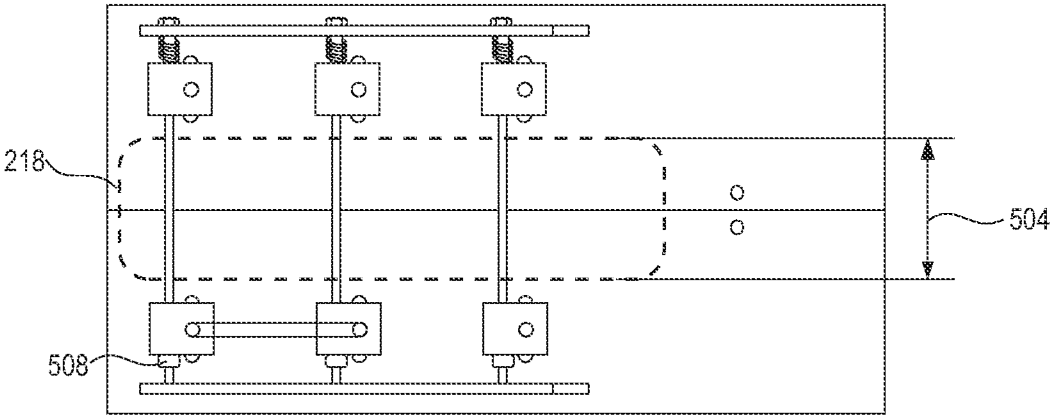
Figure 5C:
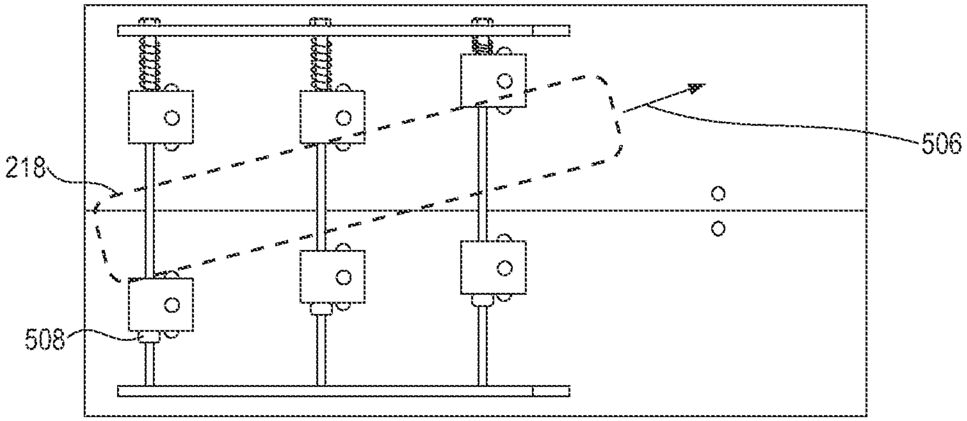

FIGS. 5A, 5B, and 5C illustrate a schematic representation of various configurations of a channel formed in between articulating wheel bodies of the male sexual stimulation toy of FIG. 4, in accordance with another embodiment of the present disclosure. In one embodiment, the plurality of stop structures 408 includes a plurality of spring tension adjusting nuts 502 and the plurality of compression coil springs 426. The plurality of spring tension adjusting nuts 502 is mounted on the plurality of mounting plates 404 and adapted to connect to one end of the plurality of compression coil springs 426. In the non-compressed state of the plurality of compression coil springs 426, the articulating wheel bodies 418 of the articulating massage wheel assembly 412 configured in the upper housing 202 and the lower housing 204 maintain a width 504 of the channel 218 of predetermined value constantly along the longitudinal direction 214 as shown in FIG. 5A. In one configuration, all the plurality of spring tension adjusting nuts 502 are rotated to a fixed number of turns to compress all the plurality of compression coil springs 426 uniformly to change the width 504 of the channel 218 to accommodate the penis 150 of different sizes as shown in FIG. 5B. In another configuration, the plurality of spring tension adjusting nuts 502 is rotated to a different number of turns to compress the plurality of compression coil springs 426 non-uniformly to alter a direction 506 of the channel 218 for insertion of the penis 150 as shown in FIG. 5C. In one configuration, the plurality of slots 414 extends from a proximal top end to the horizontal parting plane 212 of the upper housing 202 and the plurality of slots 416 extends from the horizontal parting plane 212 to a proximal bottom end of the lower housing 204. In one form, the plurality of slots 414 and 416 of the upper housing 202 and the lower housing 204 respectively is formed linear to each other along the longitudinal direction 214. In another form, the plurality of slots 414 and 416 of the upper housing 202 and the lower housing 204 respectively is formed inclinedly to each other along the longitudinal direction 214. In one scenario, the plurality of compression coil springs 426 towards the second end 102*c* of the upper housing 202 is in a compressed state and the plurality of compression coil springs 426 towards the second end 102*c* of the lower housing 204 is in a non-compressed state for changing the direction 506 of the channel 218 of insertion of the penis 150 to upward direction. In another scenario, the plurality of compression coil springs 426 towards the first end 102*b* of the upper housing 202 is in the compressed state and the plurality of compression coil springs 426 towards the first end 102*b* of the lower housing 204 is in the non-compressed state for changing the direction 506 of the channel 218 of insertion of the penis 150 to downward direction.

In another embodiment, the plurality of stop structures 408 includes a plurality of limiting structures 508 configured to adjust the plurality of sliders 410 at a particular position on the plurality of guide rails 402 to constrict the reciprocatory motion 424 of the articulating massage wheel assembly 412 along the plurality of guide rails 402 thereby adjusting the direction 506 or the width 504 of the channel 218.

In one embodiment, all the plurality of sliders 410 are adapted to adjust to fix at a particular position of the plurality of slots 414 and 416 of the upper housing 202 and the lower housing 204 respectively by the plurality of limiting structures 508 operated by the user to change the width 504 of the channel 218 to accommodate the penis 150 of different sizes. In another embodiment, each of the plurality of sliders 410 is adapted to fix at different positions of the plurality of slots 414 and 416 of the upper housing 202 and the lower housing 204 respectively by the the plurality of limiting structures 508 operated by the user to change the direction 506 of the channel 218 of insertion of the penis 150.

Figure 6A:
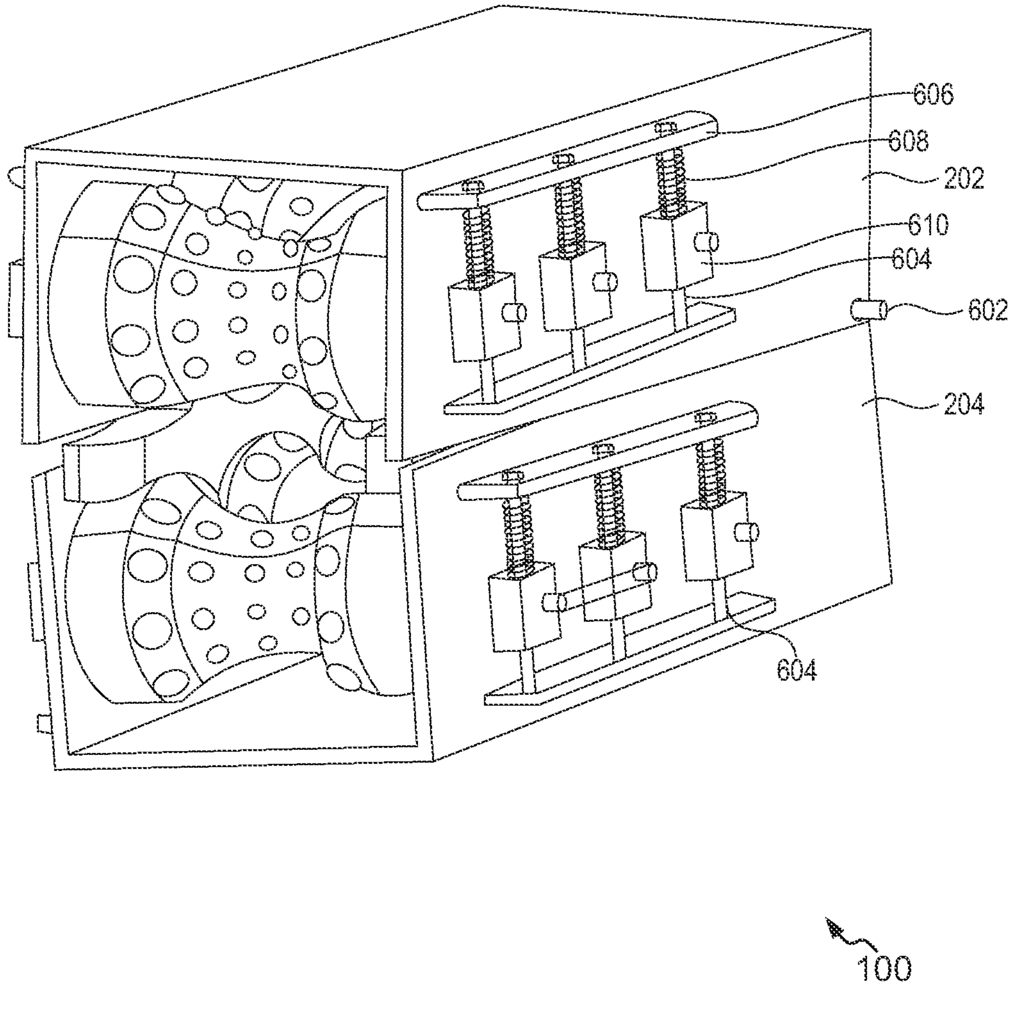
FIGS. 6A and 6B illustrate a schematic representation of coupling the housing of the male sexual stimulation toy of FIG. 4, in accordance with another embodiment of the present disclosure.
Figure 6B:
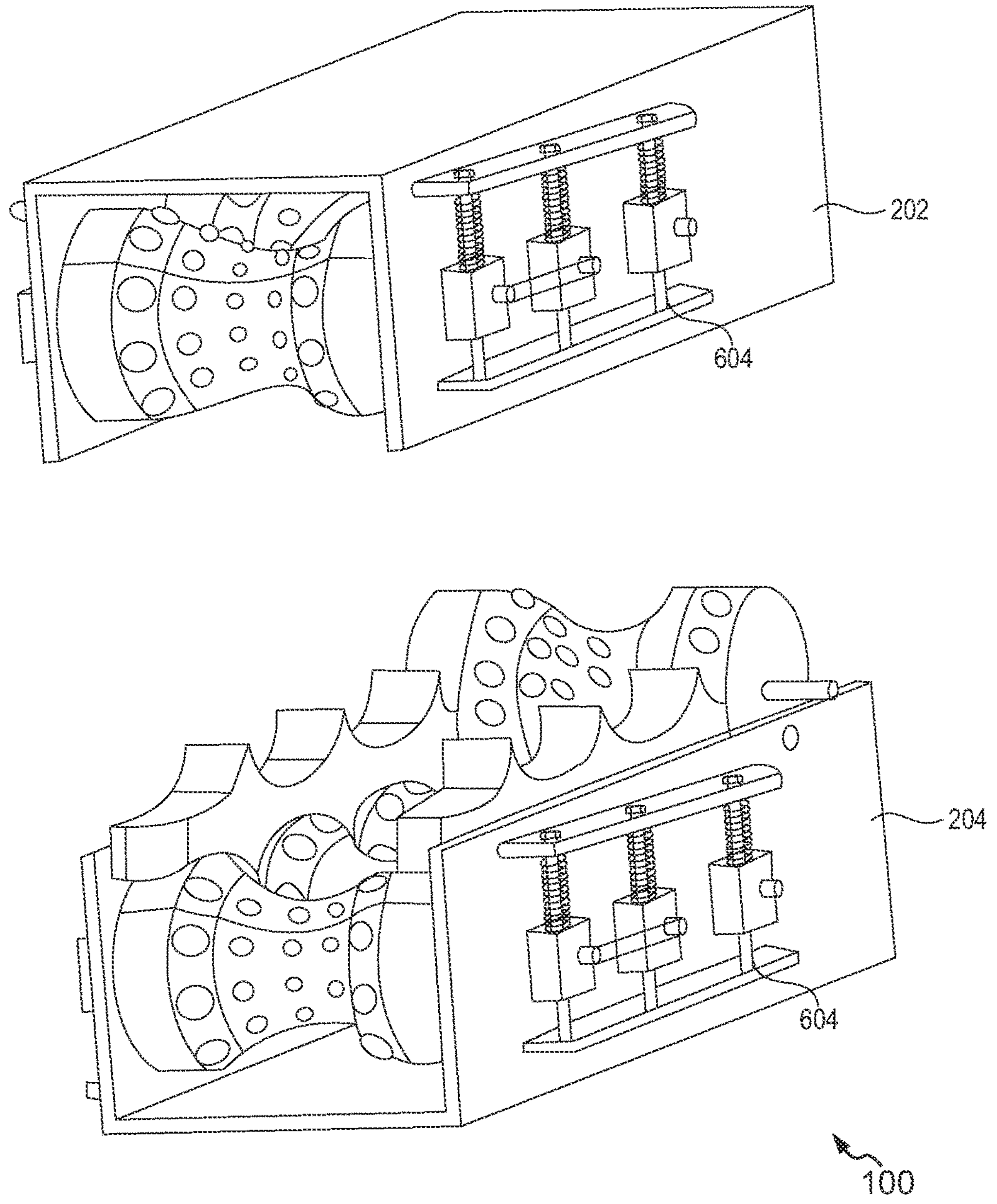

FIGS. 6A and 6B illustrate a schematic representation of coupling the housing of the male sexual stimulation toy of FIG. 4, in accordance with another embodiment of the present disclosure. In this embodiment, the male sexual stimulation toy 100 includes a hinge 602, a plurality of guide rails 604, a plurality of mounting plates 606, a plurality of stop structures 608, and a plurality of sliders 610. The plurality of guide rails 604, the plurality of sliders 610, and the plurality of stop structures 608 are adapted to configure in between the plurality of mounting plates 606 attached to the upper housing 202. Similarly, the plurality of guide rails 604, the plurality of sliders 610, and the plurality of stop structures 608 are adapted to configure in between the plurality of mounting plates 606 attached to the lower housing 204. The hinge 602 is adapted to couple to the upper housing 202 and the lower housing 204 at the second end 102*c* or the first end 102*b* in such a way that a pivot passes through a plurality of complementary holes provided in the upper housing 202 and the lower housing 204 as shown in FIG. 6A. The upper housing 202 and the lower housing 204 are relatively moved around the hinge 602 to be opened from the first end 102*b* or the second end 102*c* to position the penis 150 in the channel 218 formed in between the articulating wheel bodies 418 of the upper housing 202 and the lower housing 204 easily with minimum intervention from the user. In another embodiment, the upper housing 202 and the lower housing 204 are detachably coupled through snap fit, clamp fit or fastening means (not shown in the figure) as shown in FIG. 6B. This arrangement of coupling the upper housing 202 and the lower housing 204 through the snap-fit, clamp fit, or fastening means involves the intervention of the user to position the penis 150 in the channel 218 formed in between the articulating wheel bodies 418 of the upper housing 202 and the lower housing 204. The coupling of the upper housing 202 and the lower housing 204 through the hinge 602 or the snap-fit, clamp fit, or fastening means helps in easy cleaning of the articulating massage wheel assembly 412 of the upper housing 202 and the lower housing 204 and thereby facilitating in maintaining the hygiene of the male sexual stimulation toy 100.

Figure 7A:
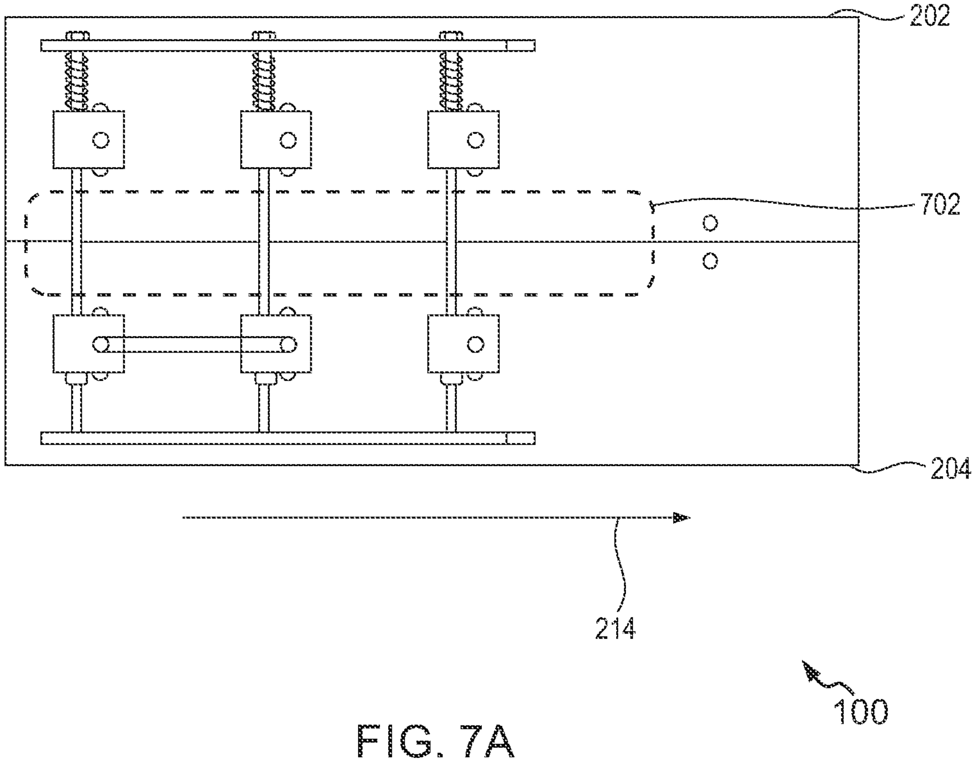
FIG. 7A illustrates a side view of the male sexual stimulation toy with a flexible sleeve, in accordance with another embodiment of the present disclosure.
Figure 7B:
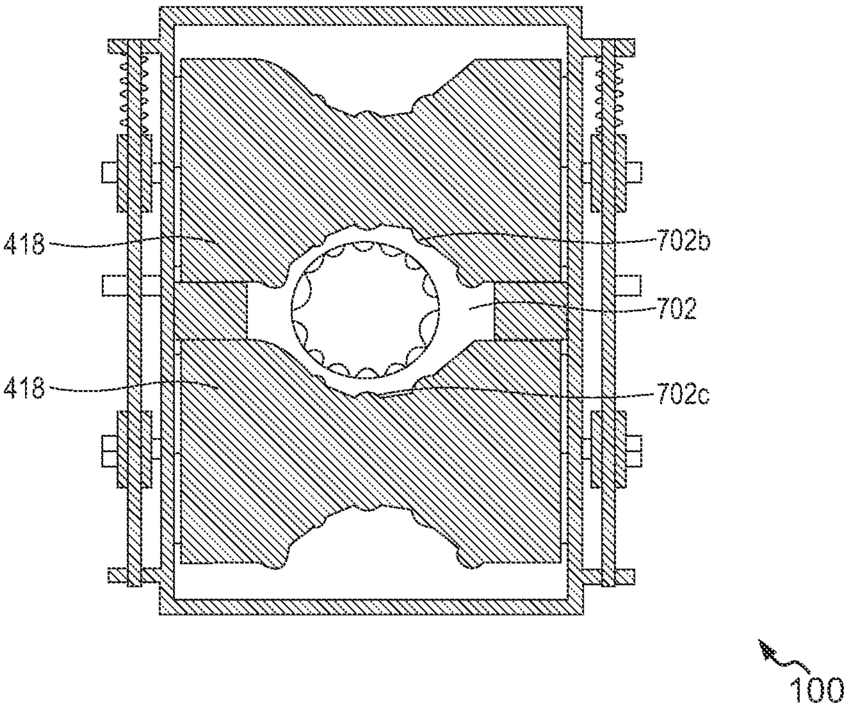
FIG. 7B illustrates cross-sectional view A-A of the male sexual stimulation toy of FIG. 7A.
Figure 8:
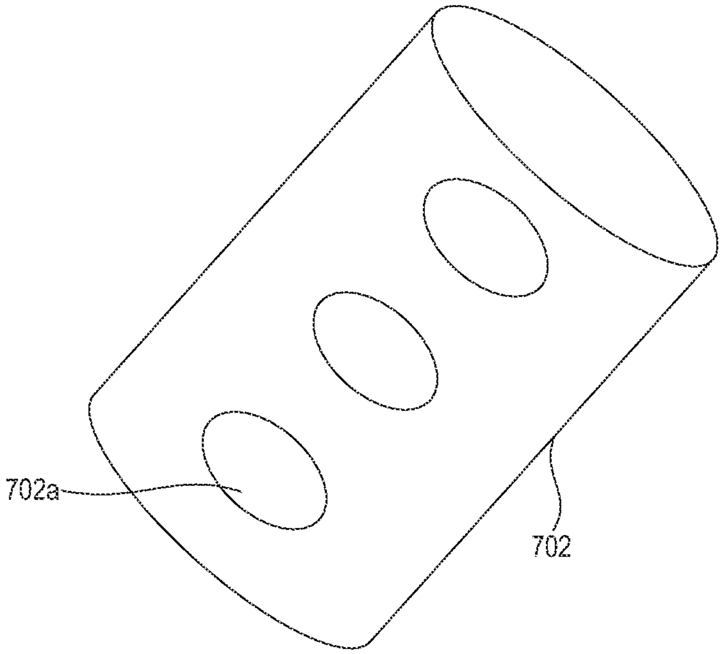
FIG. 8 illustrates a perspective view of a flexible sleeve of FIG. 7B.

FIG. 7A illustrates a side view of the male sexual stimulation toy with a flexible sleeve, in accordance with another embodiment of the present disclosure. In this embodiment, the male sexual stimulation toy 100 includes a flexible sleeve 702 configured along the longitudinal direction 214 from the opening 102*d* to the interior 106 of the upper housing 202 and the lower housing 204 coupled together. Referring to FIGS. 7B and 8, the articulating wheel bodies 418 are disposed on either side of the flexible sleeve 702 in the upper housing 202 and the lower housing 204 coupled together. The flexible sleeve 702 is a convex-shaped hose with a plurality of gaps 702*a* defined therein on a top surface 702*b* and a bottom surface 702*c* to be in operative contact with the articulating wheel bodies 418 to provide stimulation to the penis inserted into the flexible sleeve 702 by rotation. The convex-shaped hose of the flexible sleeve 702 conforms to the concave-shaped surface of the articulating wheel bodies 418. The flexible sleeve 702 acts as a sheath for protection of the penis 150 and deforms during the reciprocatory motion 424 and the rotary motion 428 of the articulating wheel bodies 418 to enable the articulating wheel bodies 418 to protrude into the plurality of gaps 702*a* of the flexible sleeve 702 to provide stimulation to the penis inserted into the flexible sleeve 702.

The flexible sleeve 702 is made up of silicone rubber or silicone material, polypropylene, polyvinylchloride, polyethylene terephthalate, and the like.

Figure 9A:
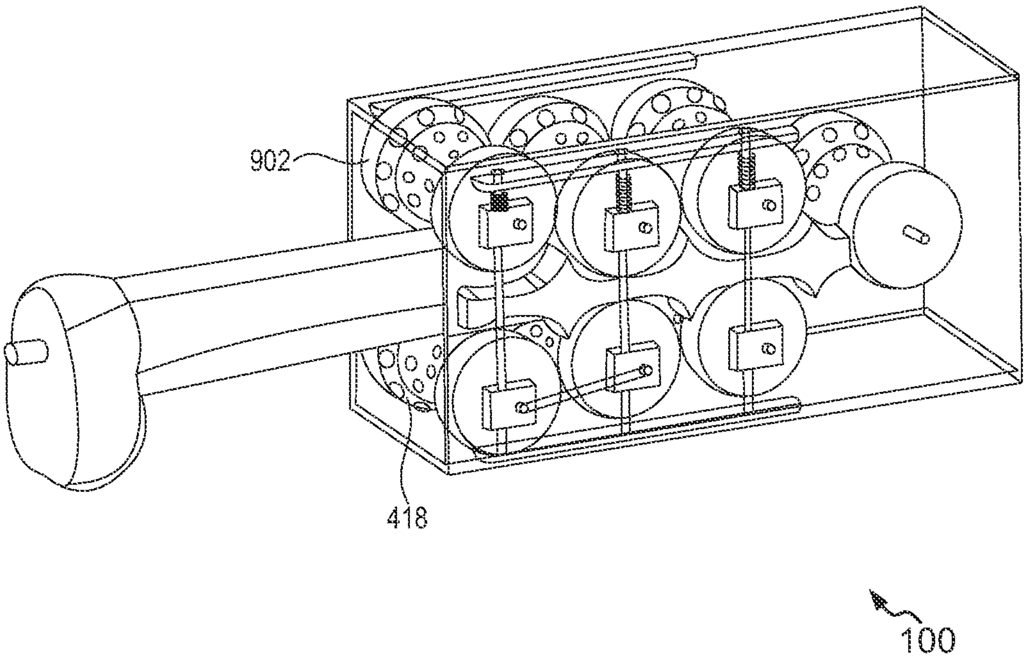
FIGS. 9A, 9B, 9C and 9D illustrate a schematic representation of various stages of operation of the male sexual stimulation toy of FIG. 4.

FIGS. 9A, 9B, 9C, and 9D illustrate a schematic representation of various stages of operation of the male sexual stimulation toy of FIG. 4. The steps involved in the operation of the male sexual stimulation toy 100 are as follows: The male sexual stimulation toy 100 is held in the hand of the user and the penis 150 is adapted to position in the channel 218 of the toy 100. The thrust force is applied to the penis 150 in the direction 114 of insertion and at the same time opposite push force is applied by the hand of the user causing the penis 150 to hit the articulating wheel bodies 418 located in a first position 902 in the upper housing 202 and the lower housing 204. The articulating wheel body 418 located in the lower housing 204 rotates within the plurality of sliders 410 in a clockwise direction 220, simultaneously producing the reciprocatory motion 424 to the articulating wheel body 418 within the plurality of slots 416 of the lower housing 204 in downward direction. At the same time, the articulating wheel body 418 located in the upper housing 202 rotates within the plurality of sliders 410 in an anti-clockwise direction 222, simultaneously producing the reciprocatory motion 424 to the articulating wheel body 418 within the plurality of slots 414 of the upper housing 202 in the upward direction. The restriction due to the plurality of stop structures 408 not only exerts pushing force but also produces a squeezing effect on the penis 150. The rotary motion 426 and the reciprocatory motion 424 of the wheel bodies 108 produce sexual stimulation on the penis 150 as shown in FIG. 9A.

Figure 9B:
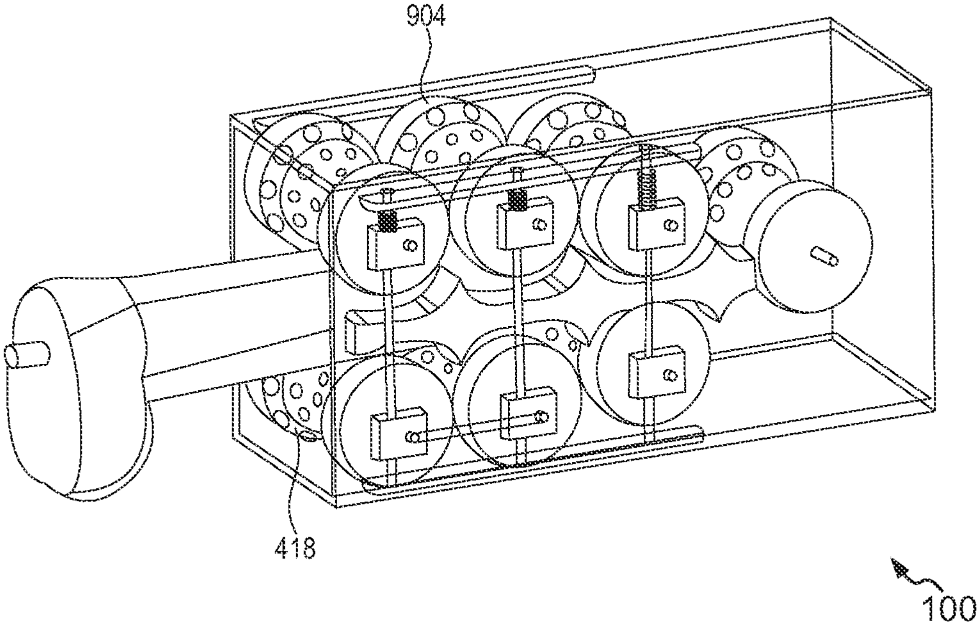

The squeezing effect on the penis 150 pulls the penis 150 to hit the articulating wheel bodies 418 located in a second position 904 in the upper housing 202 and the lower housing 204. The articulating wheel body 418 located in the lower housing 204 rotates within the plurality of sliders 410 in a clockwise direction 220, simultaneously producing the reciprocatory motion 424 to the articulating wheel body 418 within the plurality of slots 416 of the lower housing 204 in a downward direction. At the same time, the articulating wheel body 418 located in the upper housing 202 rotates within the plurality of sliders 410 in an anti-clockwise direction 222, simultaneously producing the reciprocatory motion 424 to the articulating wheel body 418 within the plurality of slots 414 of the upper housing 202 in the upward direction. The restriction due to the stop structures 408 not only exerts pushing force but also produces a squeezing effect on the penis 150. The rotary motion 426 and the reciprocatory motion 424 of the articulating wheel bodies 418 produce sexual stimulation on the penis 150 as shown in FIG. 9B.

Figure 9C:
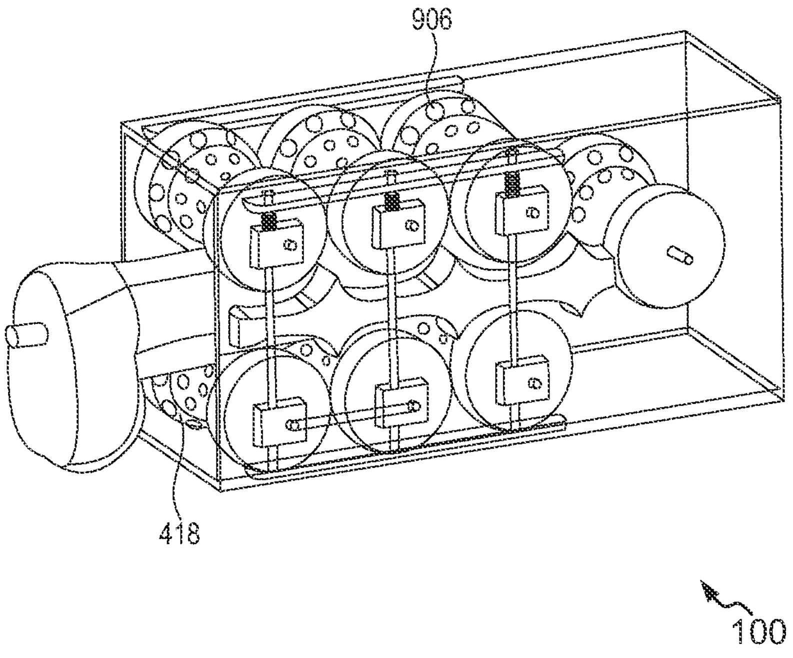

The squeezing effect on the penis 150 pulls the penis 150 to hit the articulating wheel bodies 418 located in a third position 906 in the upper housing 202 and the lower housing 204. The articulating wheel body 418 located in the lower housing 204 rotates within the plurality of sliders 410 in the clockwise direction 220, simultaneously producing the reciprocatory motion 424 to the articulating wheel body 418 within the plurality of slots 416 of the lower housing 204 in the downward direction. At the same time, the articulating wheel body 418 located in the upper housing 202 rotates within the plurality of sliders 410 in the anti-clockwise direction 222, simultaneously producing the reciprocatory motion 424 to the articulating wheel body 418 within the plurality of slots 414 of the upper housing 202 in the upward direction. The restriction due to the stop structures 408 not only exerts pushing force but also produces a squeezing effect on the penis 150. The rotary motion 428 and the reciprocatory motion 424 of the articulating wheel bodies 418 produce sexual stimulation on the penis 150 as shown in FIG. 9C.

Figure 9D:
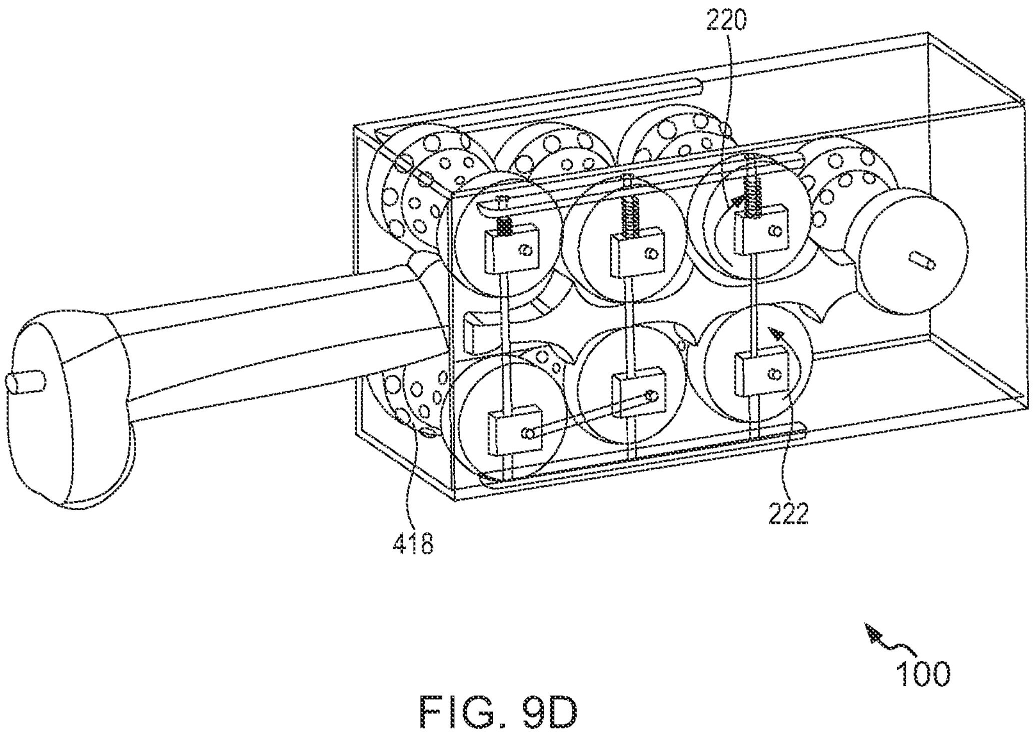

The squeezing effect on the penis 150 pulls the penis 150 to hit the stopper wheel body 224 of the stopper massage wheel assembly 208. Once the tip of the penis 150 hits the stopper wheel body 224 of the stopper massage wheel assembly 208, the user feels the sensation and he applies a force opposite to the direction 114 of insertion and at the same time, pull force is applied to the male sexual stimulation toy 100 by the user's hand externally drawing the penis 150 out of the toy 100 as shown in FIG. 9D. During the removal of the penis 150, the articulating wheel bodies 418 in the lower housing 204 rotate in the anti-clockwise direction 222 and the articulating wheel bodies in the upper housing 202 rotate in the clockwise direction 220.

The articulating wheel bodies 418 can be run mechanically by coupling with the belt, chain, or gear mechanism 228. Alternatively, the articulating wheel bodies 418 can be run electrically with the help of the motor 230. During all stages of operation, the male sexual stimulation toy 100 is held in the hand of the user.

Various embodiments of the disclosure, as discussed above, may be practiced with steps and/or operations in a different order, and/or with hardware elements in configurations, which are different from those which are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A male sexual stimulation toy, comprising:

a housing having a hollow structure with a first end and a second end opposite to the first end of the housing;

an opening formed at the first end or the second end, configured to receive a penis inserted into an interior of the housing;

an articulating massage wheel assembly disposed in the housing along at least one side of a direction of insertion of the penis, wherein the articulating massage wheel assembly includes a plurality of articulating wheel bodies and a plurality of connecting shafts, wherein a respective connecting shaft extends along a central axis of each of the articulating wheel bodies;

a plurality of guide rails mounted to the housing and adapted to couple to the articulating massage wheel assembly through the connecting shafts, wherein the articulating massage wheel assembly is configured to move along the plurality of guide rails; and a plurality of stop structures coupled to the plurality of guide rails and configured to constrict reciprocatory motion of the articulating massage wheel assembly, wherein, the articulating wheel bodies of the articulating massage wheel assembly are configured to squeeze the penis inserted due to constriction of the plurality of stop structures thereby providing sexual stimulation to the penis.

2. The male sexual stimulation toy as claimed in claim 1, further comprising a plurality of sliders adapted to couple to the connecting shafts through the plurality of guide rails, wherein the plurality of sliders are configured to slide along the plurality of guide rails.

3. The male sexual stimulation toy as claimed in claim 2, wherein the connecting shafts are configured to rotate inside the sliders to rotate the articulating wheel bodies.

4. The male sexual stimulation toy as claimed in claim 2, wherein the connecting shafts are coupled to the sliders is in a fixed condition or in a rotatable condition.

5. The male sexual stimulation toy as claimed in claim 1, wherein the housing comprises an upper housing and a lower housing adapted to be joined along a horizontal parting plane, the upper housing comprising a first hollow structure and the lower housing comprising a second hollow structure, wherein the articulating wheel bodies of the articulating massage wheel assembly comprise one or more pairs that operate relative to each other and are arranged such that one articulating wheel body in each pair is arranged in the first hollow structure and the other articulating wheel body in each pair is arranged in the second hollow structure to form a channel in between the articulating wheel bodies for insertion of the penis.

6. The male sexual stimulation toy as claimed in claim 5, wherein one or more pairs of the connecting shafts of the articulating wheel bodies are coupled through a belt, chain or gear mechanism.

7. The male sexual stimulation toy as claimed in claim 5, wherein the articulating wheel bodies arranged in the first hollow structure and the second hollow structure are separated by a resting structure mounted on either side of the horizontal parting plane of the housing to act as a safety mechanism.

8. The male sexual stimulation toy as claimed in claim 1, wherein the plurality of stop structures comprises a plurality of compression coil springs and a plurality of spring tension adjusting nuts.

9. The male sexual stimulation toy as claimed in claim 8, wherein the plurality of stop structures is configured to adjust the reciprocatory motion of the articulating massage wheel assembly on the plurality of guide rails via the plurality of spring tension adjusting nuts thereby adjusting a direction or a width of a channel for the penis in the interior of the housing.

10. The male sexual stimulation toy as claimed in claim 9, further comprising a plurality of sliders adapted to couple to the connecting shafts through the plurality of guide rails, wherein the plurality of sliders are configured to slide along the plurality of guide rails, wherein the plurality of stop structures comprises a plurality of limiting structures configured to adjust the plurality of sliders at particular positions on the plurality of guide rails to constrict the reciprocatory motion of the articulating massage wheel assembly along the plurality of guide rails thereby adjusting the direction or the width of the channel.

* * * * *